June 6, 1939.　　　　A. C. MEHL　　　　2,161,073
BEET LOADER
Filed June 23, 1938　　　　2 Sheets-Sheet 1
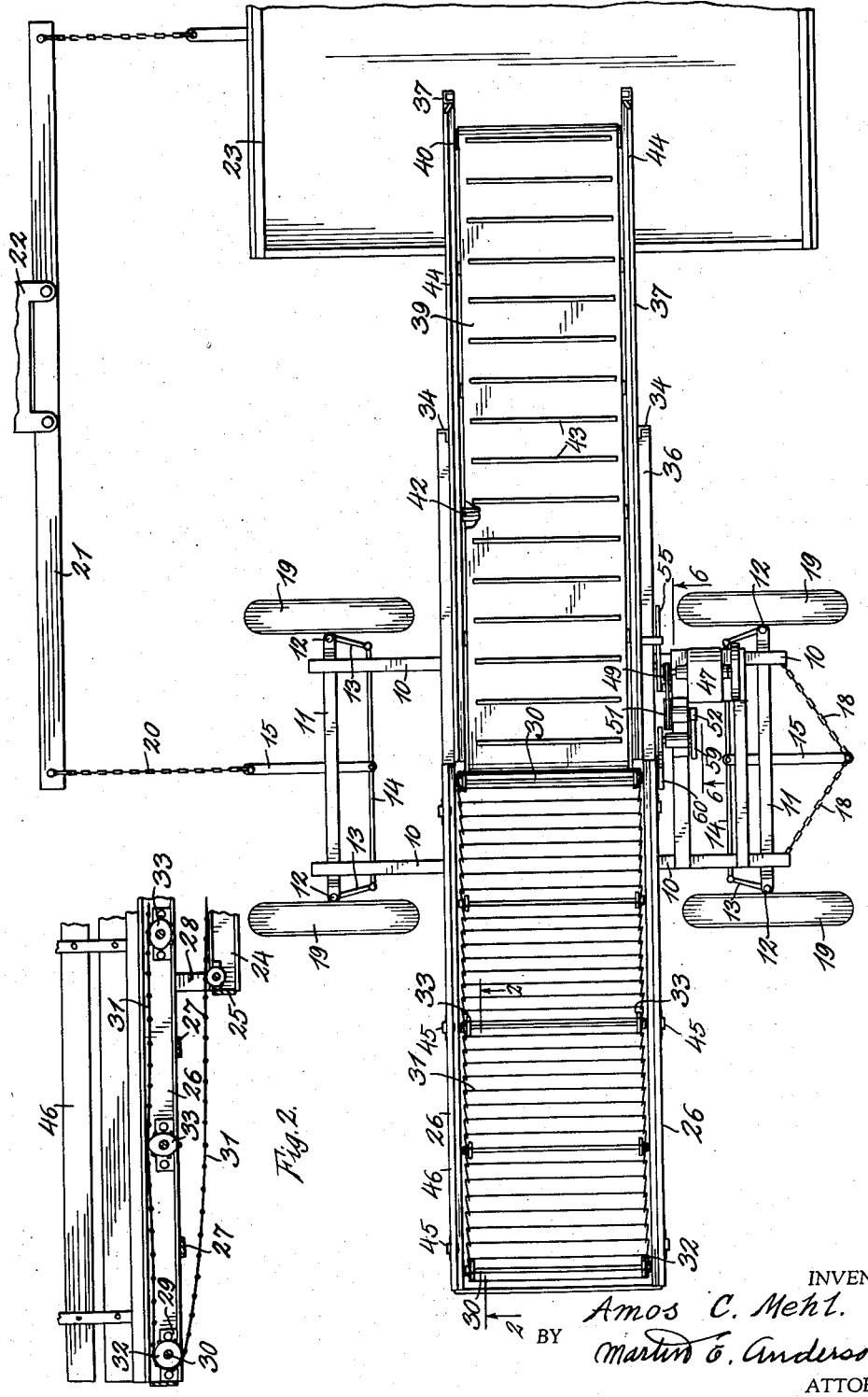
INVENTOR.
Amos C. Mehl.
BY Martin O. Anderson
ATTORNEY.

June 6, 1939.  A. C. MEHL  2,161,073
BEET LOADER
Filed June 23, 1938   2 Sheets-Sheet 2
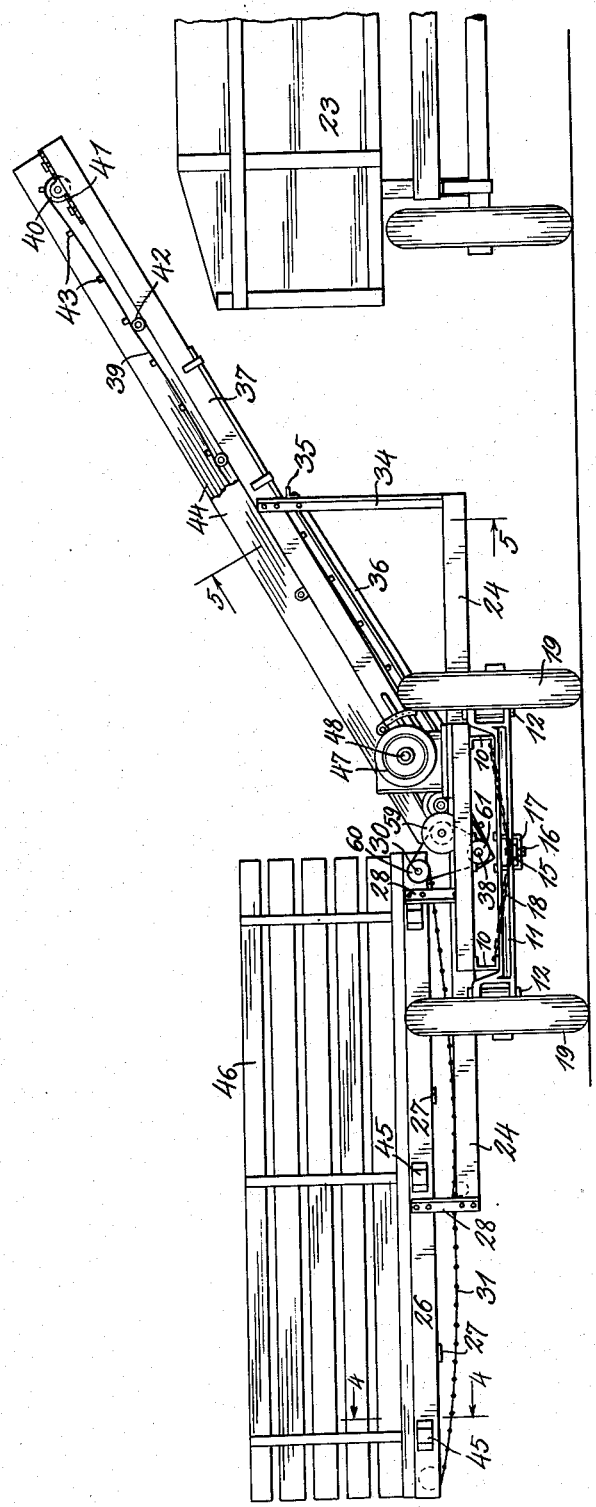
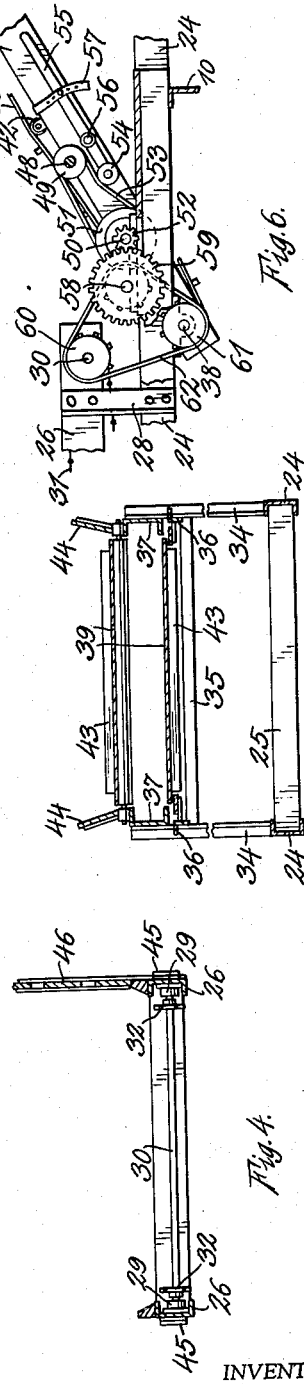
INVENTOR.
Amos C. Mehl.
BY Martin E. Anderson
ATTORNEY.

Patented June 6, 1939

2,161,073

UNITED STATES PATENT OFFICE 2,161,073

BEET LOADER

Amos C. Mehl, Crook, Colo.

Application June 23, 1938, Serial No. 215,348

6 Claims. (Cl. 209—240)

This invention relates to improvements in apparatus for loading and harvesting sugar beets.

In the harvesting of sugar beets the latter are first pulled by means of a suitable plow, after which they are topped and laid in piles and are later loaded onto trucks by men employing suitable shovels. The loading of the beets onto trucks is very hard work and constitutes the hardest labor connected with sugar beet culture.

The topping of the sugar beets is an operation that must be performed with great care and cannot be successfully accomplished by machinery because it requires judgment.

This invention relates to an improved method or system of harvesting sugar beets as well as to an improved apparatus to be used in the method.

In accordance with my method, the beets are first pulled in the usual manner and left in rows, instead of topping and throwing the beets into heaps or piles, in the usual manner. My improved harvesting device is now put into operation.

The harvesting device which forms the subject of this invention consists of a four wheel chassis having the front and the rear wheels so arranged that either end can be used as the front end. Both pair of wheels are dirigible and either pair can be locked so as to serve as the rear wheels and the pair at the opposite end can be attached to a draw bar of a tractor by a suitable tongue. Extending transversely of the chassis frame is another frame on which is mounted an open conveyor belt of the type employed in connection with potato diggers. This conveyor is driven by a small gasoline engine and discharges sugar beets onto the lower end of an upwardly and outwardly inclined conveyor that is driven by the same engine as the first conveyor and delivers the beets to a truck trailer that is also hitched to the draw bar of a tractor. The chassis wheels of the loader straddle one row of pulled beets and the transverse conveyor is of such length that it covers four rows. Two men follow the machine, each man topping two rows of beets and delivering them to the horizontal conveyor, which is so designed that it subjects them to a severe shaking for the purpose of removing dirt therefrom. The machine has a high strike board along the front of the horizontal conveyor so that the toppers do not have to employ any care in throwing the beets, as all beets that hit the strike board drop onto the conveyor. When the truck trailer is filled with topped beets it is unhitched and replaced by an empty one, the full one being picked up by a tractor truck or by teams of horses and transported to the beet dump at the factory or to the place where the beets are loaded onto freight cars for transportation to the factory. With this system, the expensive automobile trucks are not used in the field to any considerable extent and this saves them from the severe strains and wear that necessarily follow operation in the soft ground of a beet field.

Having thus briefly described the system of beet harvesting to which this invention relates and explained in a general way the apparatus employed, the apparatus will now be described in detail and reference for this purpose will be had to the accompanying drawings in which the apparatus has been illustrated and in which:

Figure 1 is a plan view showing the relationship of the trailer truck, the cleaner and loader and the tractor;

Figure 2 is a section taken on line 2—2 Fig. 1;

Figure 3 is a rear elevation of the parts shown in Fig. 1;

Figure 4 is a section taken on line 4—4 Fig. 3;

Figure 5 is a section taken on line 5—5 Fig. 3; and

Figure 6 is a section taken on line 6—6 Fig. 1.

In the drawings reference numerals 10 designate the side members of a chassis and 11 designate the axles which are made in the manner of the usual automobile front axles and have stub shafts movably connected by means of pivots 12. The stub shafts are each provided with arms 13 that are joined by bars 14, all in the manner old and well known in automobile construction. Short tongues 15 are pivotally connected with the axles by means of pins 16 and U-bolts 17. Short chains 18 or equivalent means may join the end of one of the tongues 15 with the axle, as shown in Fig. 1 for the purpose of holding the wheels 19 in fixed relation to the axle while the other tongue is connected by means of a tension member 20 with a draw bar 21 attached to a tractor 22. A trailer truck 23 is attached to the other end of the draw bar. When the chassis is to travel in the opposite direction chains 18 and 20 are interchanged so that the dirigible wheels will always be at the front end of the chassis.

Extending transversely of the chassis frame and supported on side members 10 are two channel bars 24 which are connected at their ends by transverse bars 25. A conveyor frame comprising parallel side members 26 connected by suitable transverse frame members 27 is supported from frame members 24 by suitable angle iron brackets 28. Frame members 26 are provided adjacent each end with bearings 29 in which are journalled shafts 30. The bearings at the outer end of the conveyor frame are slidably connected for the purpose of adjusting the tension of the link conveyor 31 which has been shown as of the construction ordinarily employed in connection with potato diggers. Shafts 30 are provided with circular sprocket wheels 32 that engage with the cross bars of the conveyor.

Intermediate the ends of the conveyor are a plurality of non-circular or elliptical sprockets 33 that are rotated by the conveyor and which impart to it a violent up and down movement that serves to shake loose any dirt that may adhere to the beets.

Extending upwardly from the other end of the transverse frame which comprises members 24, is a support consisting of uprights 34 connected near their upper ends by a bar 35 and joined to the sides 24 by diagonal braces 36. An upwardly inclined conveyor comprising side members 37 is supported on the transverse bar 35 and is provided at its lower end with a shaft 38 that rotates in bearings carried by the sides 37 and also in bearings carried by the frame members 24. Shaft 38 forms a pivotal connection between the conveyor frame members 37 and the transverse frame members 24 which permits the conveyor to be adjusted with respect to its vertical inclination. Shaft 38 carries a roller that serves to drive a conveyor belt 39 which passes around a similar roller 40 mounted for rotation in adjustable bearings 41 attached to the top of the sides 37. A plurality of transverse rollers 42 serves to support the conveyor belt which is provided with transverse cleats 43. Sides 44 keep the beets from falling off from the sides of the conveyor. Since the lower roller is the power driven one, the lower side of the conveyor belt will be under tension instead of the upper, as would be the case if the upper roller was power driven. It will be noted that the lower end of the upwardly inclined conveyor is positioned so as to receive beets from the cleaner conveyor. Sides 26 are provided with loops 45 that serve to support the bang board 46, which can be moved from one side to the other as the direction of movement of the loader is changed.

The two conveyors are arranged to form a transversely balanced structure and are driven from an internal combustion engine 47 whose shaft 48 carries a pulley 49. A counter shaft 50 is mounted in a suitable bearing and has a belt pulley 51 on one side of the bearing and a spur pinion 52 on the other side. A belt 53 connects pulleys 49 and 51 and cooperating with the belt is a tightener pulley 54 that is attached to one end of lever 55 that is movable about the pivot 56. Some suitable means such as that designated by reference numeral 7 serves to hold the belt tightener in adjusted position. Another counter shaft 58 is mounted for rotation in a suitable bearing and carries a spur gear 59 that meshes with the pinion 52 and on the other end a sprocket wheel that transmits power to the two sprocket wheels 60 and 61 by means of a sprocket chain 62. In actual practice there is a speed reduction of 1 to 10 between shaft 58 and shaft 48. The transmission is enclosed in a suitable housing when in use so as to be protected from dust and dirt.

The operation of the device is as follows:

The beets are first pulled and left in rows. The loader and the truck trailer are hitched to a tractor and the parts adjusted so that wheels 19 straddle a row, there being three rows outside of the outer wheel 19 so that the two toppers can top four rows. The apparatus is pulled over the field from one end to the other. At each end of the field the tractor is removed and hitched to the tongue at the other end of the loader and the latter is shifted four rows. The trailer truck is also reversed and the assembly now travels in the opposite direction. The strike board is also removed to the other side of the cleaner conveyor. The toppers throw the beets against the strike board and they drop onto the cleaner conveyor and are subjected to violent agitation, thereby loosening any adherent dirt that falls through the conveyor and the clean topped beets are delivered to the lower end of the inclined conveyor and are delivered by it to the trailer truck. When the truck body is full the trailer truck is replaced by an empty one. The reversibility of the loader makes it convenient to work back and forth along one side of the field and the tractor and the trailer truck are always traveling on cleaned ground.

This apparatus is of simple and substantial construction and makes it possible for two men to top, at least as many beets per unit of time as before, and eliminates the heavy work of shoveling the beets into trucks. This method also makes it unnecessary to use the automobile truck in the field where it would be subjected to exceedingly heavy wear due to the soft ground. When the trailer truck is full, it can be pulled to the outside of the field by the tractor.

The specific embodiment shown is illustrative only and equivalent elements of specifically different construction can be substituted wherever desired.

Having described the invention what is claimed as new is:

1. A beet cleaner and loader comprising in combination, a chassis having a pair of wheels at each end, an open link conveyor supported on the chassis, in horizontal position, and extending transversely thereof the conveyor being open at its rear and provided with a bang board at its front side, means for operating the conveyor, means for shaking the conveyor to effect the cleaning of beets deposited thereon, a second conveyor, extending in the same general direction as the first and upwardly and outwardly inclined, the lower end of the second conveyor being positioned to receive beets discharged from the first conveyor the parts being arranged to form a transversely balanced structure, and means interconnecting the two conveyors to effect simultaneous operation.

2. A beet cleaner and loader comprising, in combination, a chassis frame, a pair of wheels supporting each end, a conveyor frame supported in horizontal position on the chassis frame and extending transversely thereof, an endless open link conveyor operatively associated with the frame, means for operating the conveyor, means for shaking the conveyor while it operates to effect the cleaning of beets supported thereon, the conveyor being open at its rear and provided with a bang board along its front side, a second conveyor supported by the chassis, and extending in the same general direction as the first conveyor, the second conveyor being upwardly and outwardly inclined, the lower end of the second conveyor being positioned to receive beets from the first conveyor, raise them and deposit them in a vehicle body the conveyors being arranged to provide a transversely balanced structure, and means for effecting simultaneous operation of the conveyors.

3. A combined beet cleaner and loader comprising, in combination, a supporting vehicle having a longitudinally extending chassis frame, a supporting frame extending transversely and projecting to both sides thereof, a cleaner conveyor supported on the last mentioned frame and extending laterally beyond the corresponding end of the supporting frame, said conveyor being open at the rear and provided with a bang board at its front side, an elevating and loading conveyor carried by the supporting frame, said conveyor extending outwardly and upwardly, the lower end being positioned to receive beets from the transverse conveyor, the parts being arranged to provide a transversely balanced structure, and means comprising a prime mover positioned on the vehicle for simultaneously operating both conveyors.

4. A beet loader comprising, in combination, a vehicle having an elongated chassis frame provided at each end with a pair of wheels, a supporting frame extending transversely of the chassis frame and supported by the latter, a conveyor frame positioned above the supporting frame and attached thereto, the conveyor frame being substantially horizontal and projects laterally of the chassis frame on one side thereof, a conveyor belt associated with the conveyor frame, said conveyor being open at its rear and provided with a bang board on its front side, an elevating conveyor carried by the supporting frame, said elevating conveyor being upwardly and outwardly ranging, the lower end of the elevating conveyor being positioned to receive beets from the transverse conveyor, power transmission means interconnecting the two conveyors for simultaneous movement the parts being arranged to provide a transversely balanced structure, an internal combustion engine carried by the vehicle and means for driving the power transmitting means from the engine.

5. A beet loader comprising, in combination, a vehicle having an elongated chassis frame provided at each end with a pair of wheels, a supporting frame extending transversely of the chassis frame and supported by the latter, a conveyor frame positioned above the supporting frame and attached thereto, the conveyor frame being substantially horizontal and projects laterally of the chassis frame on one side thereof, a conveyor belt associated with the conveyor frame, said conveyor being open at its rear and provided with a bang board at its front side, an elevating conveyor carried by the supporting frame, said elevating conveyor being upwardly and outwardly ranging, the lower end of the elevating conveyor being positioned to receive beets from the transverse conveyor, the parts being arranged to provide a transversely balanced structure, power transmission means interconnecting the two conveyors for simultaneous movement, an internal combustion engine carried by the vehicle, means for driving the power transmitting means from the engine, said last means comprising a releasable transmission mechanism and means for rendering the same operative or inoperative at will.

6. A beet loader comprising, in combination, a vehicle having an elongated chassis frame provided at each end with a pair of wheels, a supporting frame extending transversely of the chassis frame and supported by the latter, a conveyor frame positioned above the supporting frame and attached thereto, the conveyor frame being substantially horizontal and projects laterally of the chassis frame on one side thereof, a conveyor belt associated with the conveyor frame, said conveyor being open at its rear and provided with a bang board at its front side, an elevating conveyor carried by the supporting frame, said elevating conveyor being upwardly and outwardly ranging, the lower end of the elevating conveyor being positioned to receive beets from the transverse conveyor, the parts being arranged to provide a transversely balanced structure, power transmission means interconnecting the two conveyors for simultaneous movement, an internal combustion engine carried by the vehicle, means for transmitting power from the engine to the power transmitting means which interconnects the conveyor, and means for loosening and tightening the belt to stop and start the conveyors.

AMOS C. MEHL.